(12) United States Patent
Anthru et al.

(10) Patent No.: US 9,769,414 B2
(45) Date of Patent: Sep. 19, 2017

(54) AUTOMATIC MEDIA ASSET UPDATE OVER AN ONLINE SOCIAL NETWORK

(75) Inventors: Shemimon Manalikudy Anthru, Dayton, NJ (US); Jens Cahnbley, Princeton Junction, NJ (US); David Anthony Campana, Kirkland, WA (US); David Brian Anderson, Hamilton, NJ (US); Ishan Mandrekar, Monmouth Junction, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 759 days.

(21) Appl. No.: 13/501,989

(22) PCT Filed: Oct. 14, 2010

(86) PCT No.: PCT/US2010/002740
§ 371 (c)(1),
(2), (4) Date: May 17, 2012

(87) PCT Pub. No.: WO2011/046605
PCT Pub. Date: Apr. 21, 2011

(65) Prior Publication Data
US 2012/0221645 A1 Aug. 30, 2012

Related U.S. Application Data

(60) Provisional application No. 61/251,705, filed on Oct. 14, 2009.

(51) Int. Cl.
*H04N 21/462* (2011.01)
*H04N 21/4788* (2011.01)
(Continued)

(52) U.S. Cl.
CPC ......... *H04N 5/44543* (2013.01); *H04N 7/173* (2013.01); *H04N 21/4622* (2013.01);
(Continued)

(58) Field of Classification Search
CPC ....... H04N 21/44222; H04N 21/44218; H04N 21/47; H04N 21/60; H04N 21/435
See application file for complete search history.

(56) References Cited

U.S. PATENT DOCUMENTS 6,754,904 B1 * 6/2004 Cooper et al. .................. 725/32
6,990,677 B1 * 1/2006 Pietraszak et al. ............. 725/49
(Continued)

FOREIGN PATENT DOCUMENTS

| CN | 101547297 | 9/2009 |
|---|---|---|
| JP | 2009152745 | 12/2007 |

(Continued)

OTHER PUBLICATIONS

Baca et al (Television meets Facebook: Social Networks through Consumer Electronics, Mar. 1, 2008, 2 pages).*
(Continued)

*Primary Examiner* — Kevin Bates
*Assistant Examiner* — Jeyanath Jeyaratnam
(74) *Attorney, Agent, or Firm* — Tutunjian & Bitetto, P.C.

(57) ABSTRACT

An electronic program guide is displayed where the program guide indicates the various media being consumed by a plurality of users. Such users can be linked together via a relationship from a social networking website. In addition, the grid can display broadcast channel listings. The grid optionally provides the feature of adding and removing corresponding user and channel listings.

27 Claims, 10 Drawing Sheets

900

| | 7:00 | 8:00 | 9:00 |
|---|---|---|---|
| Bob - Twitter | Youtube Video A | DVD -Transformers | XM - Radio Station 133 |
| Jerry - Twitter | Twitter | Youtube Videos B,C,D | Channel 12.1 - Spiderfan |
| Lisa - Facebook | Channel 9.1 - Learning Not to Hate | Radio Station - WGN 720 AM | Tears for Fears - Songs from the Big Chair |
| Simon - Facebook | Barton Fink | | Off |
| 2 - CBS | CSI NY | CSI LA | CSI in Space |
| 5 - NBC | Jay Leno | Mr T Show | Dateline |
| 7 - ABC | Lost | LeShow | 20/20 |

(51) Int. Cl.
*H04N 21/482* (2011.01)
*H04N 5/445* (2011.01)
*H04N 7/173* (2011.01)
*H04N 21/442* (2011.01)

(52) U.S. Cl.
CPC ..... *H04N 21/4788* (2013.01); *H04N 21/4821* (2013.01); *H04N 21/44222* (2013.01); *H04N 21/482* (2013.01)

(56) References Cited

U.S. PATENT DOCUMENTS

| | | | |
|---|---|---|---|
| 7,203,952 B2* | 4/2007 | Broadus | 725/40 |
| 2002/0035727 A1 | 3/2002 | Numata et al. | |
| 2004/0117853 A1* | 6/2004 | Karaoguz et al. | 725/134 |
| 2004/0128680 A1 | 7/2004 | Karaoguz et al. | |
| 2006/0085835 A1* | 4/2006 | Istvan et al. | 725/119 |
| 2008/0026694 A1 | 1/2008 | Ramanathan et al. | |
| 2008/0072246 A1 | 3/2008 | Meng | |
| 2008/0244681 A1 | 10/2008 | Gossweiler et al. | |
| 2009/0133071 A1 | 5/2009 | Sakai et al. | |
| 2009/0241158 A1 | 9/2009 | Campagna et al. | |

FOREIGN PATENT DOCUMENTS

| | | |
|---|---|---|
| JP | 2009141952 | 6/2009 |
| WO | 01/50309 A2 | 7/2001 |
| WO | 2008/103364 A1 | 8/2008 |

OTHER PUBLICATIONS

Rosario (Television meets Facebook: Social Networks through Consumer Electronics, Jan. 6, 2009, 13 pages).*
Baca et al (Television meets Facebook: Social Networks through Consumer Electronics, Mar. 1, 2008, 5 pages).*
Baca, Mariana, et al., "Television meets Facebook: Social Networks through Consumer Electronics", XP-002622057, 2 pgs.
Lee, Hyowon, et al., "Balancing the Power of Multimedia Information Retrieval and Usability in Designing Interactive TV", XP-002622058, pp. 105-114.
International Search Report dated Mar. 24, 2011, 3 pgs.
International Search Report dated Jan. 21, 2011, 3 pgs.

* cited by examiner

| Friend | 7:00 | 8:00 | 9:00 |
|---|---|---|---|
| Bob - Twitter | Youtube Video A | DVD - Transformers | XM - Radio Station 133 |
| Jerry - Twitter | Twitter | Youtube Videos B,C,D | Channel 12.1 - Spiderfan |
| Lisa - Facebook | Channel 9.1 - Learning Not to Hate | Radio Station - WGN 720 AM | Tears for Fears - Songs from the Big Chair |
| Simon - Facebook | Barton Fink | Barton Fink | Off |

| | 7:00 | 8:00 | 9:00 |
|---|---|---|---|
| Bob - Twitter | Youtube Video A | DVD -Transformers | XM - Radio Station 133 |
| Jerry - Twitter | Twitter | Youtube Videos B,C,D | Channel 12.1 - Spiderfan |
| Lisa - Facebook | Channel 9.1 - Learning Not to Hate | Radio Station - WGN 720 AM | Tears for Fears - Songs from the Big Chair |
| Simon - Facebook | Barton Fink | | Off |
| 2 - CBS | CSI NY | CSI LA | CSI in Space |
| 5 - NBC | Jay Leno | Mr T Show | Dateline |
| 7 - ABC | Lost | LeShow | 20/20 |

| 1000 | 7:00 | 8:00 | 9:00 |
|---|---|---|---|
| Bob - Twitter | Youtube Video A | DVD -Transformers 42% | XM - Radio Station 133 |
| Carmen - Facebook | Barton Fink - HBO | | South Park - Comedy Central |
| Lisa - Facebook | Channel 9.1 - Learning Not to Hate | Radio Station - WGN 720 AM | Tears for Fears - Songs from the Big Chair |
| Simon - Facebook | Barton Fink- http://www.netflix.com | 53% | Off |
| Facebook - Friends | David Letterman | Mr T Show | South Park - Comedy Central |
| 2 - CBS | CSI NY | CSI LA | CSI in Space |
| 5 - NBC | Jay Leno | Mr T Show | Dateline |
| 9 - WGN | DC CAB | | News |

FIG. 10

AUTOMATIC MEDIA ASSET UPDATE OVER AN ONLINE SOCIAL NETWORK

This application claims the benefit, under 35 U.S.C. §365 of International Application PCT/US2010/002740, filed Oct. 14, 2010 which was published in accordance with PCT Article 21(2) on Apr. 21, 2011 in English and which claims the benefit of U.S. provisional patent application No. 61/251,705, filed Oct. 14, 2009.

BACKGROUND OF THE INVENTION

In the use of a device that is used to watch video or play audio, a user may be interested in informing their friends or other people about the type of media that they are currently consuming. For example, a user watching a video which is being played on a device such a set top box, may want to inform their friends about a particular television show. Although a person may consider calling their friend over a telephone, it becomes very difficult and inefficient to do such a process for a number of friends.

With the growth of things like social networks such as LINKEDIN, MYSPACE, FACEBOOK, TWITTER, and the like, it has become much easier to keep in contact with a group of friends or contacts without having to contact each of them individually. Such online social networks provide some type of messaging mechanism, such as a status update, which allows a primary user to input text which indicates some aspect about the user where the user manually inputs such text into a text window. This message is then transmitted to other users to which the primary user has linked to, or is listed on their friends list. Currently, such communications across different social networking platforms provides a large degree of difficulty.

SUMMARY OF THE INVENTION

According to one aspect of the present disclosure, a method for indicating a media asset that a user is consuming is described. Specifically, information about the asset will be posted to a social networking website which can be accessed by other users. A non-consuming user, that is the user who is not currently consuming the asset, can interact with a content manager and retrieve the described media asset or an alternative media asset depending on the content privileges of the non-consuming user.

According to another aspect of the present disclosure, an electronic program guide view is described. The electronic program guide grid represents various programs and media assets that users are consuming over a period of time. The grid is developed through the information that such users transmit to an online social network. Multiple users and online social networks can be listed in the grid view.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIGS. 8-10 provide views of an electronic program guide grid detailing the media that different consuming users have accessed.

Figure 1:
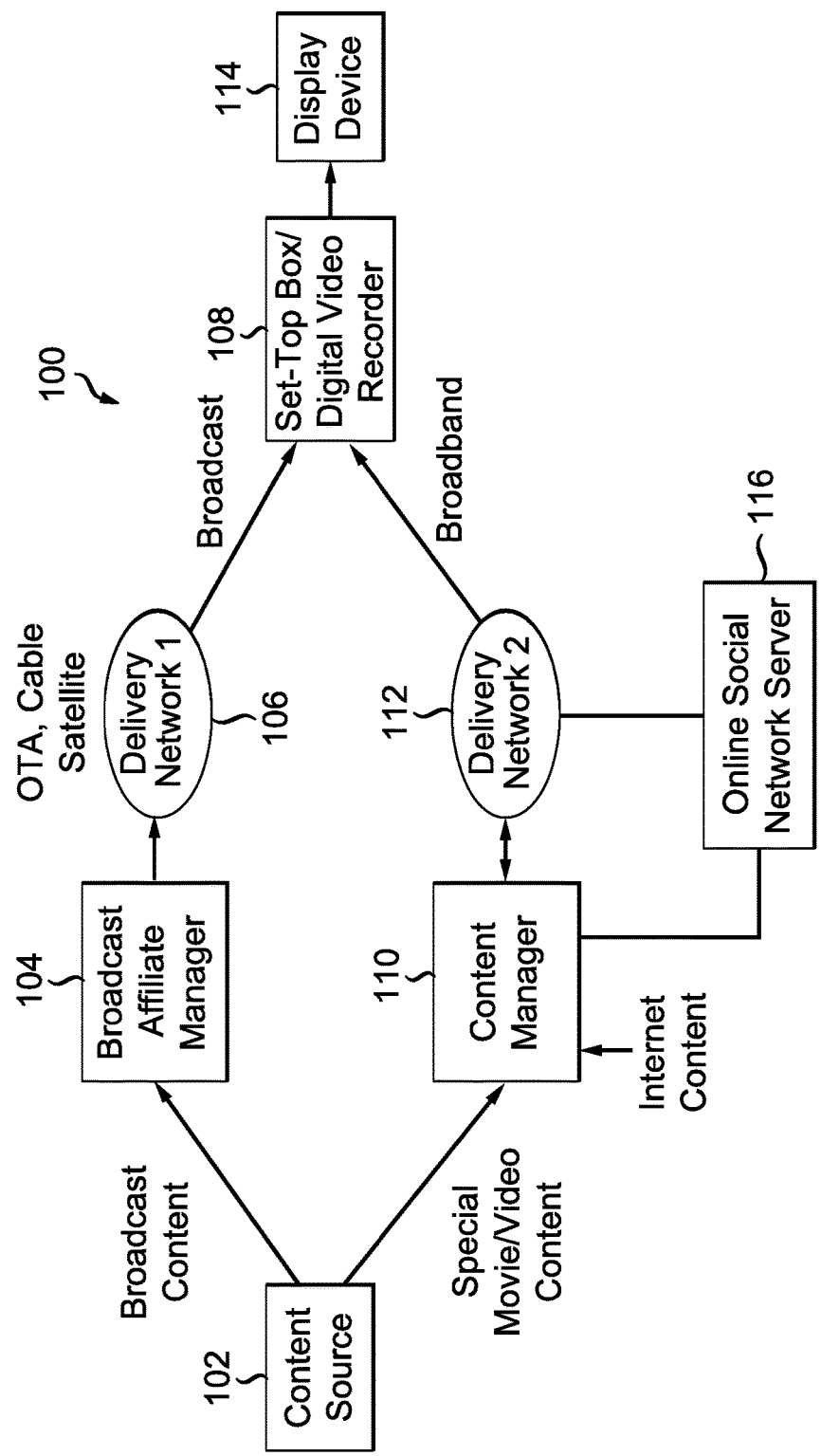
FIG. 1 shows a block diagram of an embodiment of a system for delivering content to a home or end user.

It should be understood that the drawing(s) is for purposes of illustrating the concepts of the disclosure and is not necessarily the only possible configuration for illustrating the disclosure.

DETAILED DESCRIPTION OF THE INVENTION

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown. The computer readable media and code written on can be implemented in a transitory state (signal) and a non-transitory state (tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Using inventive concepts, the principles discussed below present a scenario where users share their media consuming habits using communication medium such as online social networks such as Facebook, LinkedIn, and the like.

The term online social network (OSN) can also be defined as an architecture that allows a first user to communicate with one or more users, without having to send a unique message to each user. That is, in the social network, there is efficiency in how messages are communicated to such users. In addition, social networks typically have a feature in where users permissively indicate whether or not they want to be "linked" to a second user. This type of feature can be implemented where a first user adds a second user to their list. The social networking site can then recommend other users that the first user knows, which would be presented with the list of users that are on a list controlled by the second user. The social network of the first user can be expanded upon the contacts in the individuals in the second list.

Within the description below, the principles of the present invention provides mechanisms for a user to transmit to their social network various information about the assets that the user is consuming. This fosters new ways of social interaction such as virtual group viewing, rating, recommending etc. Specifically, when using a consuming device such as a phone, tablet, set top box, video game system, personal computer, and the like, a user can indicate what media is consumed (watching/listening to) while using the consuming device.

Different fields are introduced below where such fields are used to indicate different properties about a media asset. The fields are described in this application using the use of a "tag" in the form of <<FIELD>>. Particular attributes for such fields can be added using various separations as indicated <<FIELD &ATTRIBUTE1 &ATTRIBUTE2 &ATTRIBUTE3 . . . >>. It is understood that fields and attributes can also be constructed where a particular hash combination (MD5, SHA1, and the like) can represent the contents of a field and associated attributes. Other implementations can be performed in accordance with the principles of the present invention.

TABLE 1

| | |
|---|---|
| <<SERVICE ID>> | This field represents a particular social networking service or other messaging medium that can be used. |
| &FACEBOOK | Facebook |
| &TWITTER | Twitter |
| &LINKEDIN | Linked-In |
| &FLICKER | Flicker Photo Sharing |
| &QZONE | Q-Zone |
| &MYSPACE | MySpace |
| &BEBO | Bebo |
| &SMS | Text Messaging Service |
| &USERNAME | User Name of a person using a social networking service |

TABLE 2

| | |
|---|---|
| <<ASSETID>> | This field represents the "name" of the media asset which is used for identifying the particular asset |
| &UUID | A universal unique identifier that is used for the media asset. This can be a unique MD5, SHA1, other type of hash, or other type of identifier |
| &NAME | A text name for the media asset |
| &TIME | Time that a media asset is being accessed. This information can be seconds, hours, days, day of the week, date, and other time related information |
| &ASSETCOMPLETE | The % of completion in the consumption of an asset |

The term media asset (as described below for TABLE 3) can be: a video based media, an audio based media, a television show, a movie, an interactive service, a video game, a HTML based web page, a video on demand, an audio/video broadcast, a radio program, advertisement, a podcast, and the like.

TABLE 3

| | |
|---|---|
| <<ASSETTYPE> | This field represents the type of asset that is being communicated to a user of a social networking website. |
| &VIDEO | Video based asset |
| &AUDIO | Audio based asset |
| &PHOTO | Photo based asset |
| &TELEVISION | Television show asset which can be audio, video, or a combination of both |
| &MOVIE | Movie asset which can be audio, video, or a combination of both |
| &HTML | HTML based web page |
| &PREVIEW | Trailer which can be audio, video, or a combination of both |
| &ADMOVE | Advertisement asset—expected to be video and/or audio based such as a flash animation, H.264 video, SVC video, and the like. |

TABLE 3-continued

| | |
|---|---|
| &ADSTAT | Advertisement asset—expected to be a static image such as a JPG, PNG, and the like that can be used as a banner ad |
| &TEXT | Text Message |
| &RADIO | An audio asset that comes from terrestrial and/or satellite radio |
| &GAME | Game asset. |
| &INTERACTIVE | An interactive based media asset |
| &PODCAST | Podcast that is audio, video, or a combination of both |
| &APPLICATION | Indicates that a user utilized a particular type of application or accessed a particular service |

TABLE 4

| | |
|---|---|
| <<PERMISSONS>> | This field represents the various permissions for a particular asset. |
| &FULLRECORD | Allows an asset to be fully recorded to a user's device. |
| &NORECORD | Prevents an asset from being recorded to a user's device. |
| &FULLVIEW | Allows a user to fully consume a media asset. |
| &TIMEVIEW | A parameter that limits a user's consumption of an asset to a predetermined amount of time. This parameter can be followed by a numeric value indicating how many seconds the asset can be viewed. |
| &TIMEEXPIRE | A parameter that indicates when a user's ability to consume device expires. This value can be followed by two numeric values that indicate the date the asset expires and the particular time of day (GMT format) |
| &FRAME | A parameter that specifies that only a frame from a particular asset is to be viewed, such as a still image. A numeric value can be used to specify a particular frame. Alternatively, a numeric value representing a time code which indicates where in the asset the frame is supposed to be generated. |
| &INTERVAL | A parameter that indicates a particular interval in a media asset that a user can access. This attribute can be two numeric values indicating different frame numbers of the video asset. This attribute can also be two numeric values representing time codes for a particular media asset. The first value being the start of the interval and the second value being the end of the interval. |
| &HIGH | A parameter that indicates that a high definition version of an media asset is to be available |
| &LOW | A parameter that indicates that a low definition version of a media asset is to be available. |

TABLE 5

| | |
|---|---|
| <<LOCATION> | This field represents the location of a particular media asset |
| &URL | The location of a media asset expressed as a uniform resource locator and/or IP address |
| &PATH\PATH... | The location of a media asset expressed as a particular local or remote path which can have multiple subdirectories. |
| &REMOTE | The location of a media asset in a remote location which would be specified by text after the remote attribute. |
| &LOCAL | The location of a media asset in a local location which would be specified by text after the remote attribute. |
| &BROADCAST | The location being a broadcast source such as satellite, broadcast television channel, cable channel, radio station, and the like |
| &BROADCASTID | The identifier of the broadcast channel used for transmitting a media asset, and the like |

TABLE 6

| | |
|---|---|
| <<PARENTALRATING>> | Parental Rating Information that is used to rate a particular media asset. Different parental ratings that can be used include Y, Y7, G, PG, 14 and MA. Other systems can be used. |
| <<CONTENTRATING> | A content rating that assigns a particular value to a media asset which is the critic rating of content. Typically, this is denoted as how many stars a movie has received. Other numeric values (0-100) or letter grades (A, B, C, D and F) can be used as well. |

Initially, systems for delivering various types of content and for providing online social networking services to a user will be described.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, cable broadcast or from an external network via IP. The locally delivered content is provided to a user's set top box/digital video recorder (DVR) 108 in a user's home, where the content will subsequently be included in the body of available content that may be searched by the user.

A second form of content is referred to as special content. Special content may include content delivered as premium viewing, pay-per-view, or other content otherwise not provided to the broadcast affiliate manager. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system, or explicitly into the search only such that content may be searched that has not yet been delivered to the user's set top box/digital video recorder 108. The content manager 110 may deliver the content to the user's set top box/digital video recorder 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of Delivery network 1 (106). In addition, the user may also obtain content directly from the Internet via delivery network 2 (112) without necessarily having the content managed by the content manager 110. In addition, the scope of the search goes beyond available content to content that may be broadcast or made available in the future.

The set top box/digital video recorder 108 may receive different types of content from one or both of delivery network 1 and delivery network 2. The set top box/digital video recorder 108 processes the content, and provides a separation of the content based on user preferences and commands. The set top box/digital video recorder may also include a storage device, such as a hard drive or optical disk drive, for recording and playing back audio and video content. Further details of the operation of the set top box/digital video recorder 108 and features associated with playing back stored content will be described below in relation to FIG. 3. The processed content is provided to a display device 114. The display device 114 may be a conventional 2-D type display or may alternatively be an advanced 3-D display. It should be appreciated that other devices having display capabilities such as wireless phones, PDAs, computers, gaming platforms, remote controls, multi-media players, or the like, may employ the teachings of the present disclosure and are considered within the scope of the present disclosure.

Delivery network 2 is coupled to an online social network 116 which represents a website or server in which provides a social networking function. For instance, a user operating set top box 108 can access the online social network 116 to access electronic messages from other users, check into recommendations made by other users for content choices, see pictures posted by other users, refer to other websites that are available through the "Internet Content" path.

Online social network server 116 can also be connected with content manager 110 where information can be exchanged between both elements. Media that is selected for viewing on set top box 108 via content manager 110 can be referred to in an electronic message for online social networking 116 from this connection. This message can be posted to the status information of the consuming user who is viewing the media on set top box 108. That is, a user using set top box 108 can instruct that a command be issued from content manager 110 that indicates information such as the <<ASSETID>>, <<ASSETTYPE>>, and <<LOCATION>> of a particular media asset which can be in a message to online social networking server 116 listed in <<SERVICE ID>> for a particular user identified by &USERNAME.

Content manager 110 sends this information to the indicated social networking server 116 listed in the <<SERVICE ID>>, where an electronic message for &USERNAME has the information comporting to the <<ASSETID>>, <<ASSETTYPE>>, and <<LOCATION>> of the media asset posted to status information of the user. Other users who can access the social networking server 116 can read the status information of the consuming user to see what media the consuming user has viewed.

Figure 2:
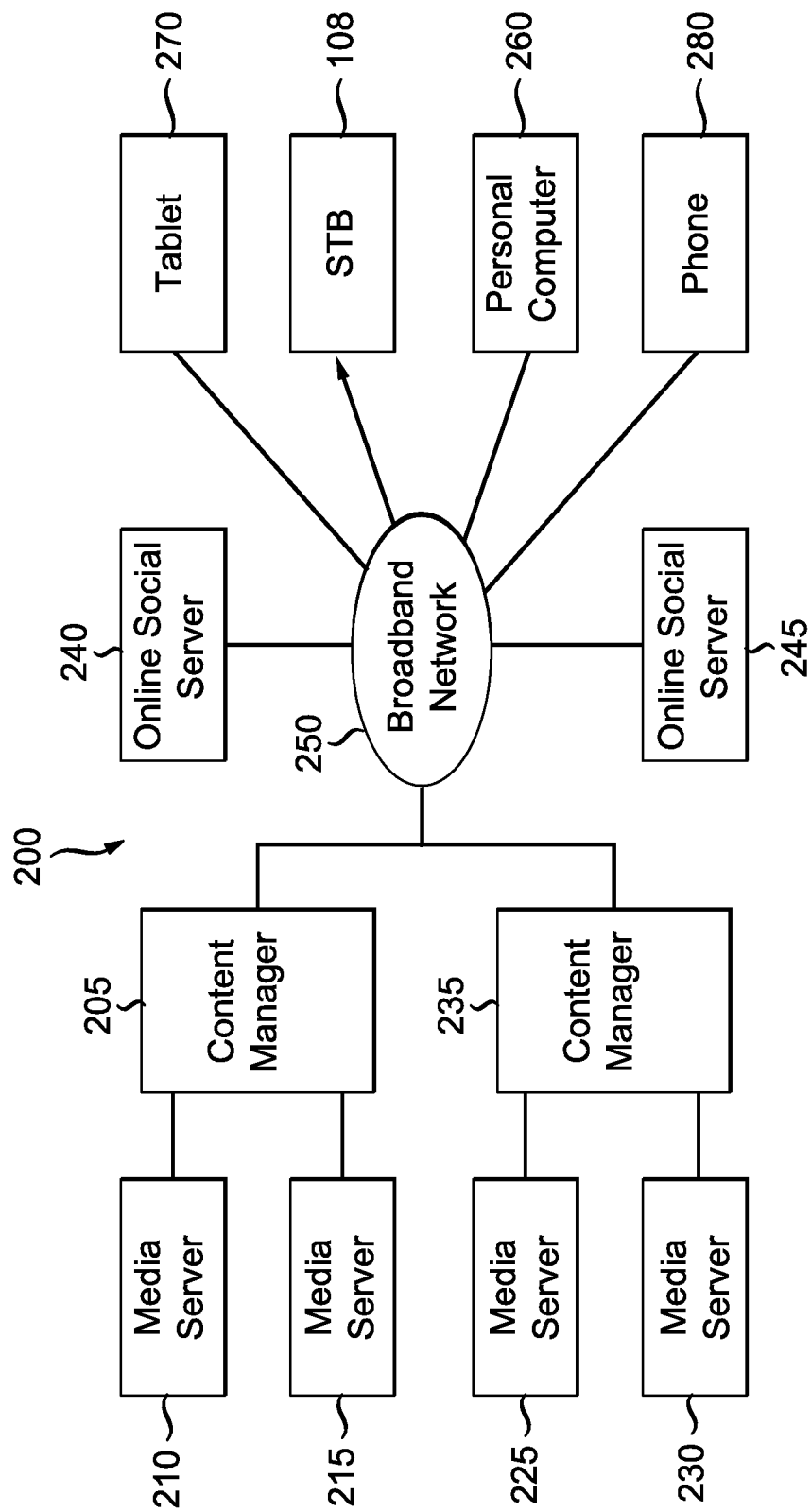
FIG. 2 presents a block diagram of a system that presents an arrangement of media servers, online social networks, and consuming devices for consuming media.

FIG. 2 presents an a block diagram of a system 200 that presents an arrangement of media servers, online social networks, and consuming devices for consuming media. Media servers 210, 215, 225, and 230 represent media servers where media is stored. Such media servers can be a hard drive, a plurality of hard drives, a server farm, a disc based storage device, and other type of mass storage device that is used for the delivery of media over a broadband network.

Media servers 210 and 215 are controlled by content manager 205. Likewise, media server 225 and 230 are controlled by content manager 235. In order to access the content on a media server, a user operating a consumption device such as STB 108, personal computer 260, table 270, and phone 280 can have a paid subscription for such content. The subscription can be managed through an arrangement with the content manager 235. For example, content manager 235 can be a service provider and a user who operates STB 108 has a subscription to programming from a movie channel and to a music subscription service where music can be transmitted to the user over broadband network 250. Content manager 235 manages the storage and delivery of the content that is delivered to STB 108. Likewise, other subscriptions can exist for other devices such as personal computer 260, tablet 270, and phone 280, and the like. It is noted that the subscriptions available through content manager 205 and 235 can overlap, where for example; the content comporting for a particular movie studio such as DISNEY can be available through both content managers. Likewise, both content managers 205 and 235 can have differences in available content, as well, for example content manager 205 can have sports programming from ESPN while content manager 235 makes available content that is from FOXSPORTS.

With having content delivered through a content manager 205, 235, a subscription is not the only way that content can be authorized. Some content can be accessed freely through a content manager 205, 235 where the content manager does not charge any money for content to be accessed. Content manager 205, 235 can also charge for other content that is delivered as a video on demand for a single fee for a fixed period of viewing (# of hours). Content can be bought and stored to a user's device such as STB 108, personal computer 260, tablet 270, and the like where the content is received from content managers 205, 235. Other purchase, rental, and subscription options for content managers 205, 235 can be utilized as well.

Online social servers 240, 245 represent the servers running online social networks that communicate through broadband network 250. Users operating a consuming device such as STB 108, personal computer 260, tablet 270, and phone 280 can interact with the online social servers 240, 245 through the device, and with other users. One feature about a social network that can be implemented is that users using different types of devices (PCs, phones, tablets, STBs) can communicate with each other through a social network. For example, a first user can post messages to the account of a second user with both users using the same social network, even though the first user is using a phone 280 while a second user is using a personal computer 260. Broadband network 250, personal computer 260, tablet 270, and phone 280 are terms that are known in the art. For example, a phone 280 can be a mobile device that has Internet capability and the ability to engage in voice communications.

Figure 3:
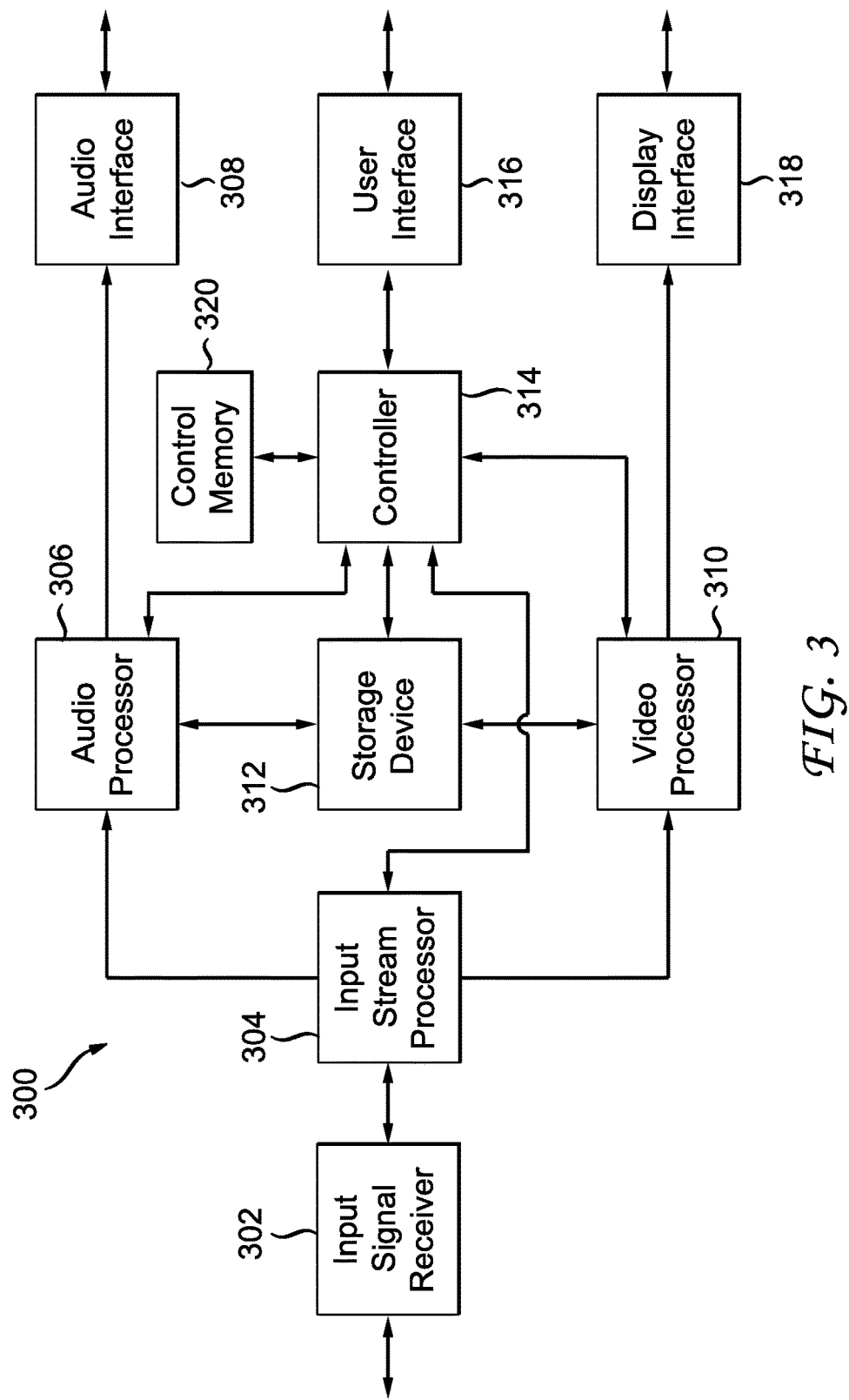
FIG. 3 shows a block diagram of an embodiment of a set top box/digital video recorder.

Turning now to FIG. 3, a block diagram of an embodiment of the core of a set top box/digital video recorder 300 is shown, as an example of a consuming device. The device 300 shown can also be incorporated into other systems including the display device 114. In either case, several components necessary for complete operation of the system are not shown in the interest of conciseness, as they are well known to those skilled in the art.

In the device 300 shown in FIG. 3, the content is received in an input signal receiver 302. The input signal receiver 302 can be one of several known receiver circuits used for receiving, demodulation, and decoding signals provided over one of the several possible networks including over the air, cable, satellite, Ethernet, fiber and phone line networks. The desired input signal may be selected and retrieved in the input signal receiver 302 based on user input provided through a control interface (not shown). The decoded output signal is provided to an input stream processor 304. The input stream processor 304 performs the final signal selection and processing, and includes separation of video content from audio content for the content stream. The audio content is provided to an audio processor 306 for conversion from the received format, such as compressed digital signal, to an analog waveform signal. The analog waveform signal is provided to an audio interface 308 and further to the display device 114 or an audio amplifier (not shown). Alternatively, the audio interface 308 may provide a digital signal to an audio output device or display device using a High-Definition Multimedia Interface (HDMI) cable or alternate audio interface such as via a Sony/Philips Digital Interconnect Format (SPDIF). The audio processor 306 also performs any necessary conversion for the storage of the audio signals.

The video output from the input stream processor 304 is provided to a video processor 310. The video signal may be one of several formats. The video processor 310 provides, as necessary a conversion of the video content, based on the input signal format. The video processor 310 also performs any necessary conversion for the storage of the video signals.

A storage device 312 stores audio and video content received at the input. The storage device 312 allows later retrieval and playback of the content under the control of a controller 314 and also based on commands, e.g., navigation instructions such as fast-forward (FF) and rewind (Rew), received from a user interface 316. The storage device 312 may be a hard disk drive, one or more large capacity integrated electronic memories, such as static random access memory, or dynamic random access memory, or may be an interchangeable optical disk storage system such as a compact disk drive or digital video disk drive. In one embodiment, the storage device 312 may be external and not be present in the system.

The converted video signal, from the video processor 310, either originating from the input or from the storage device 312, is provided to the display interface 318. The display interface 318 further provides the display signal to a display device of the type described above. The display interface 318 may be an analog signal interface such as red-green-blue (RGB) or may be a digital interface such as high definition multimedia interface (HDMI). It is to be appreciated that the display interface 318 will generate the various screens for presenting the search results in a three dimensional array as will be described in more detail below.

The controller 314 is interconnected via a bus to several of the components of the device 300, including the input stream processor 302, audio processor 306, video processor 310, storage device 312, and a user interface 316. The controller 314 manages the conversion process for converting the input stream signal into a signal for storage on the storage device or for display. The controller 314 also manages the retrieval and playback of stored content. Furthermore, as will be described below, the controller 314 performs searching of content, either stored or to be delivered via the delivery networks described above. The controller 314 is further coupled to control memory 320 (e.g., volatile or non-volatile memory, including random access memory, static RAM, dynamic RAM, read only memory, programmable ROM, flash memory, EPROM, EEPROM, etc.) for storing information and instruction code for controller 214. Further, the implementation of the memory may include several possible embodiments, such as a single memory device or, alternatively, more than one memory circuit connected together to form a shared or common memory. Still further, the memory may be included with other circuitry, such as portions of bus communications circuitry, in a larger circuit.

To operate effectively, the user interface 316 of the present disclosure employs an input device that moves a cursor around the display, which in turn causes the content to enlarge as the cursor passes over it. In one embodiment, the input device is a remote controller, with a form of motion detection, such as a gyroscope or accelerometer, which allows the user to move a cursor freely about a screen or display. In another embodiment, the input device is a controller in the form of touch pad or touch sensitive device that will track the user's movement on the pad, on the screen. In another embodiment, the input device could be a traditional remote control with direction buttons.

Figure 4:
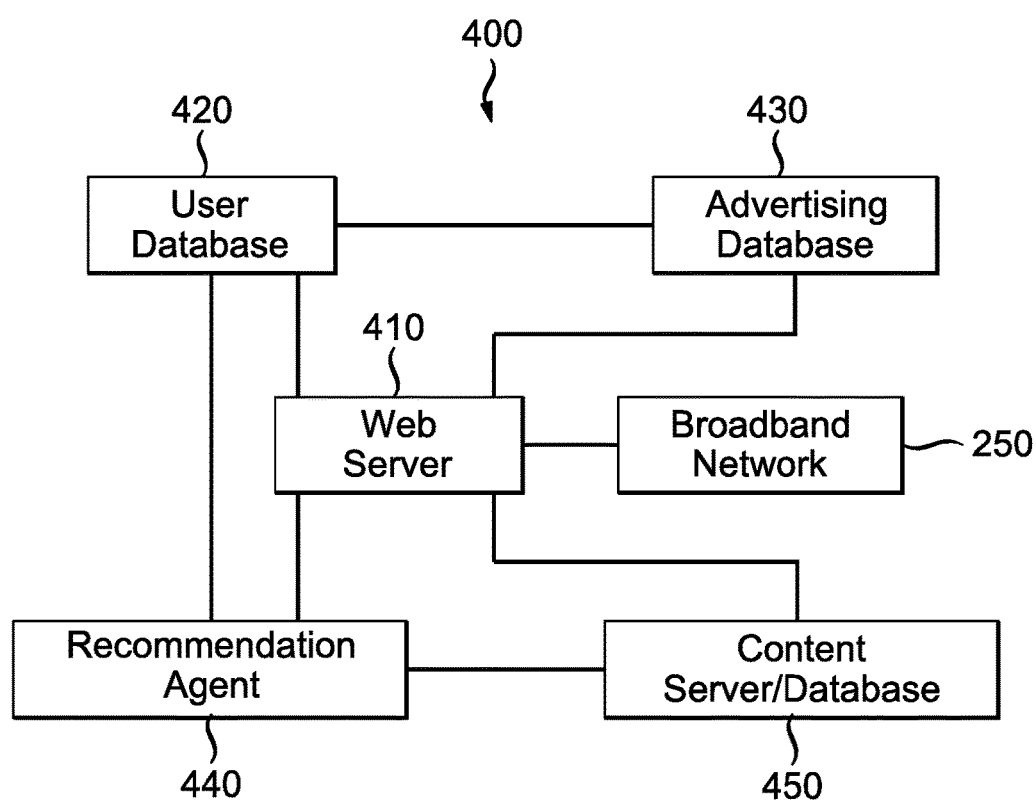
FIG. 4 presents a block diagram of an exemplary online social network as implemented in an online social server.

FIG. 4 presents a block diagram of an exemplary online social network 400 as implemented in an online social server 240, 245. Online social network 400 has a web server 410 that is capable of generating web pages in HTML, JAVA, and the like for viewing on a consuming device. Web server 410 can also be implemented as running as an application server will the online social network experience is run as an application on a user's device, and the application server handles the various application calls between the application and the back end running on server 240, 245 which run through the connection of broadband network 250.

User database 420 stores information about the various users that use online social network 400. Such information can include biographical information about the user, specific interests selected by the user, information about the other users that are linked to the user, and the like. Advertising database 430 contains various ads that are delivered to the user when using online social network 400. Different types of ads that can be delivered include text, pictures, graphic files, banners, audio, video, animations, and the like.

Recommendation agent 440 is a computer program that is run on server 240, 245 that makes various recommendations to a user. Such recommendations can be other users that the user should consider linking to, advertisements that user can be interested in, content the user can be interested in, and the like. Typically, a recommendation agent will use a mathematically developed model that finds correlations between various topics or subjects, where various behaviors of a user impact what will be recommendation. For example, the recommendation model can be built around a series of business rules where a user with the demographic of being a young male will have video game advertisements suggested to them, while a young female child can have advertisements suggested to her concerning educational products.

Content server/database 450 contains various media that can be delivered to a user. Content database 450 can also be implemented where various subscriptions between different content managers 205, 235 can be managed. That is, some of the content that can be made available through online social network 400 can come from media servers 210, 215, 225, 230, and the like.

Figure 5:
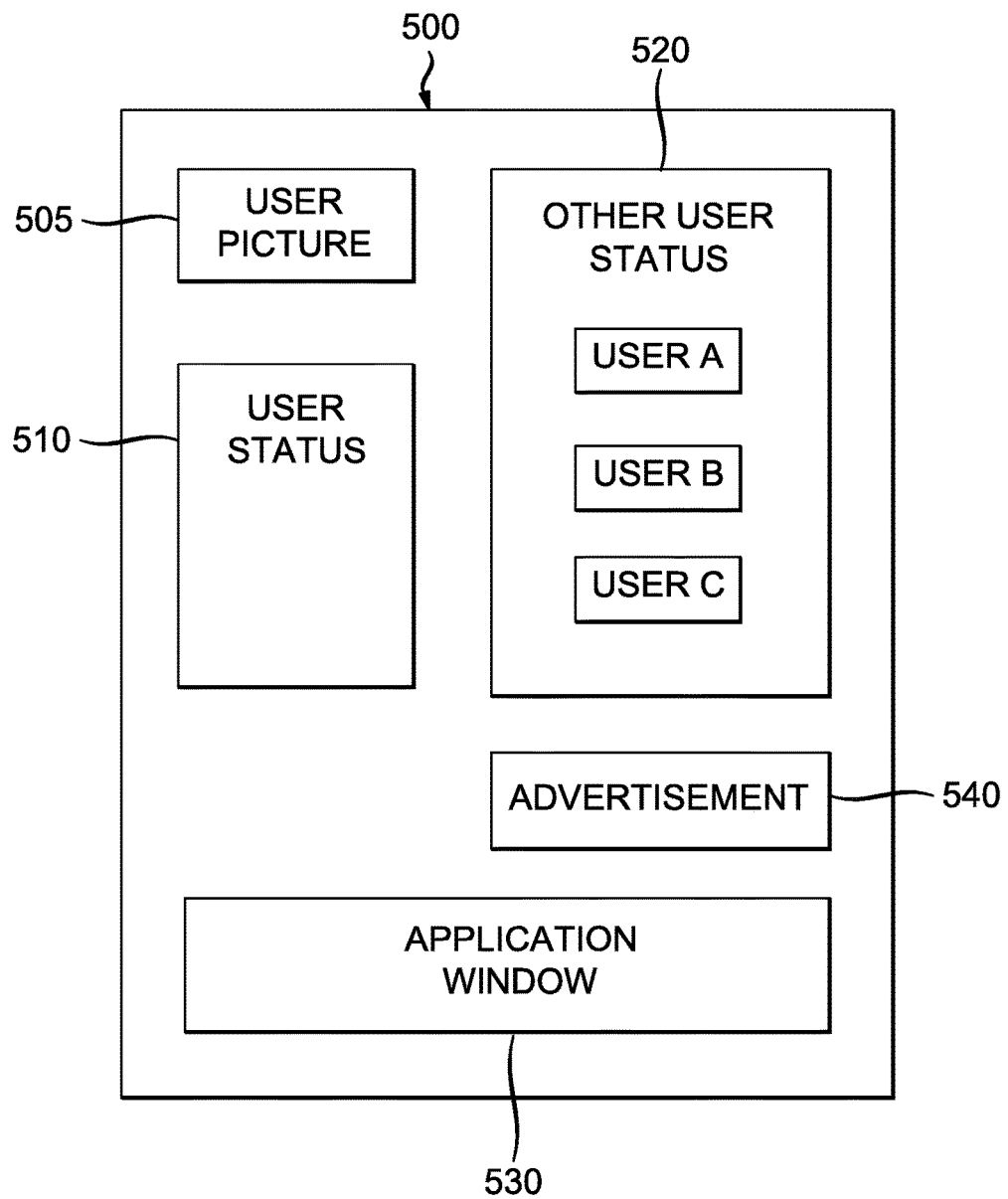
FIG. 5 presents an exemplary view of an online social networking page.

FIG. 5 presents an exemplary view of an online social networking page 500 as generated by online social server 240, 245. User picture 505 corresponds to a graphic file that a user has selected to be associated with a user profile stored in user database 420.

User status 510 indicates an area for various information that a user decided to be associated with their profile. Within the context of a user status there can be various levels of information that a user decides can be made available. Information about a public profile can be established for a user, where this would be information selected by a user which is made available to any person who accesses an online social server 240, 245. A second level of information can be made available for a user to any user to who the user is linked to through the social networking site. These are "linked" users which can receive updates in changes made in the user status 510 area. A third level of information of user information that is meant only for the user. This can be information such as the amount of time the user spends on online social network 240, 245, the last internet protocol address used to log into the online social network 240, 245, when the next payment is due for maintaining an account an online social networking 240, 245, the various subscriptions of a user, and the like.

Other user status 520 represents the area where user receives updates from other users, which are denoted as user A, user B, and user C, respectively. These updates can be text messages, graphic files, links to web sites, links to media, and media themselves, and the like. Typically, a user update will be associated with a particular user by using some identifying information such text, graphic, animation, and the like. For example, a user update from user A can be a simple text message while an update from user B is a graphic which when selected brings up a web browser and a web page.

Application window 530 is an area for the online social networking page 500 where an application is run. Some social networks allow for users to play games which are rendered in an area of the social networking page 500. Likewise, application window 530 is an area that can be used for rending media where media such as audio, video, animation, static graphic, text, and the like can be played in this area. Application window 530 can also be used as a real time communication interface (chat, instant messaging, web camera, voice over internet, and the like) to communicate between users using online social network server 240, 245. Other applications can be run-in application window 530 as well.

It is contemplated that the content shown for social networking page 500 can be shown between different devices. For example, in a home where a user has access to both a set top box 108 and tablet 270, the areas comporting to user picture 505, user status 510, and other user status 520 is shown on set top box 108 while the application window 530 is shown on tablet 270. Other variations of what is shown for an online social network page 500 can be implemented, as well.

When a user updates an online social networking page 500, the user logs in to the OSN server 240, 245 and enters information into an area such as user status 510. This works well for a user when the updates are few and far between, but once the user decides to share his television watching information—an event that is both realtime and dynamic in nature—the manual entry of such information fall short. The TV watching user would instinctively expect the update to happen at the click of a remote control button in keeping with the traditional experience that operating a television set provides. The user also expects to be shielded from the intricacies of a particular online social network 240, 245 and would like a consistent method of "posting" to any OSN website. In certain other cases where the user would like to share a log of what he has been watching over a certain timeline, the action needs to be completely automated without the need for any type of intervention.

A message flow description of how a user (as a media asset consuming user) publishes (posts) information about a media asset starts with the user watching/listening to a media asset. While consuming such an asset, the user presses a button on a remote control to indicate that the user wants to publish information about the asset. For example, if a user is using a STB 108, an application running under the control of control 314 can generate a message <<SERVICE ID>>&USERNAME, <<ASSETID>>&NAME&TIME, <<ASSETTYPE>>, <<LOCATION>> which is directed to a online social server.

One implementation of listing what a user is interested in is provided in Pandora where a Facebook mini-feed is pushed into a user's status area in Facebook. This allows for a user to import all his Pandora activity into a Facebook news feed. This listening information can now be shared with "linked users" allowing such users to stay abreast of all the latest musical discoveries. Friends can click on links to listen to music/stations posted by the mini-feed on behalf of the user. The limitation to such information however is that it is only meaningful for users who use the same social networking website and use PANDORA. If a user does not have access to both, the user cannot use the information of the PANDORA pushed mini-feed.

Hence, one principle to be explored is that the user consuming a particular piece of media will not be limited to a particular network. Unlike PANDORA which can operate as a walled garden and limits users to what exists within such a network, a user can access a multitude of different media sources. The device, using concepts described herein, will be configured to identify the content and the particular method for accessing such content. For example, if a particular song is being listened to from a content manager 205, the consuming device being used for playback of the song can use metadata, in response to a command issued by the consuming user, to formulate an informational message about the song. This informational message would be automatically formatted into the proper format for a social network 240, 245, whereby the social network could transmit along the formatted message.

Considering this example, a consuming device such as STB 108 is being used to listen to audio from a content manager 205. The audio of the song is being streamed from media server 210 to the STB 108 via broadband network 250. If the user decides to post information about the song to a social network server 240, the consuming device 108 runs software that formats a message indicating information comporting to <<SERVICE ID>>&USERNAME, <<ASSETID>>&NAME&TIME,<<ASSETTYPE>> &AUDIO, <<LOCATION>>. The metadata for some of these fields can come from the content manger 205, media server 210, the user, and the like. The fields and the corresponding information are then transmitted from STB 108 to social network server 240, where the information is published to a user's status area 510.

Concerning the playback of a song which is played via a radio station, a consuming device can utilize identification software such as Shazam or Songbird to fingerprint acoustic characteristics about the song. Once again when metadata is obtained, the device would format such metadata into an informational message which can be sent to a social network, automatically. Similar approaches are envisioned for video programming where metadata from the video asset itself, program guide information, external databases, and the like can be used to develop metadata about the video asset. That is, approaches described for audio assets can also be used for video assets, and vice versa.

A similar implementation of the invention can be performed if a user is watching a TV program or a web video clip being rendered by a set top box 108. The user activates a button on a remote control whereby set top box 108 generates a message containing <<SERVICE ID>>&USERNAME, <<ASSETID>>&NAME&TIME, <<ASSETTYPE>>&VIDEO, <<LOCATION>>, which is transmitted by the set top box 108 to an online social server 240. Such information is then published as an update to area 510.

Such updates can be broken up between different consuming devices where a user makes use of a synchronized secondary screen to post a status update a page 500. In this scenario, a secondary screen knows about the current program being watched on the primary screen and is in synch with it. This could be achieved by running a web application server on the STB 108 which can access the currently watching program information by querying the STB middleware software. The STB 108 in turn communicates this information to the secondary screen via a web server.

Figure 6:
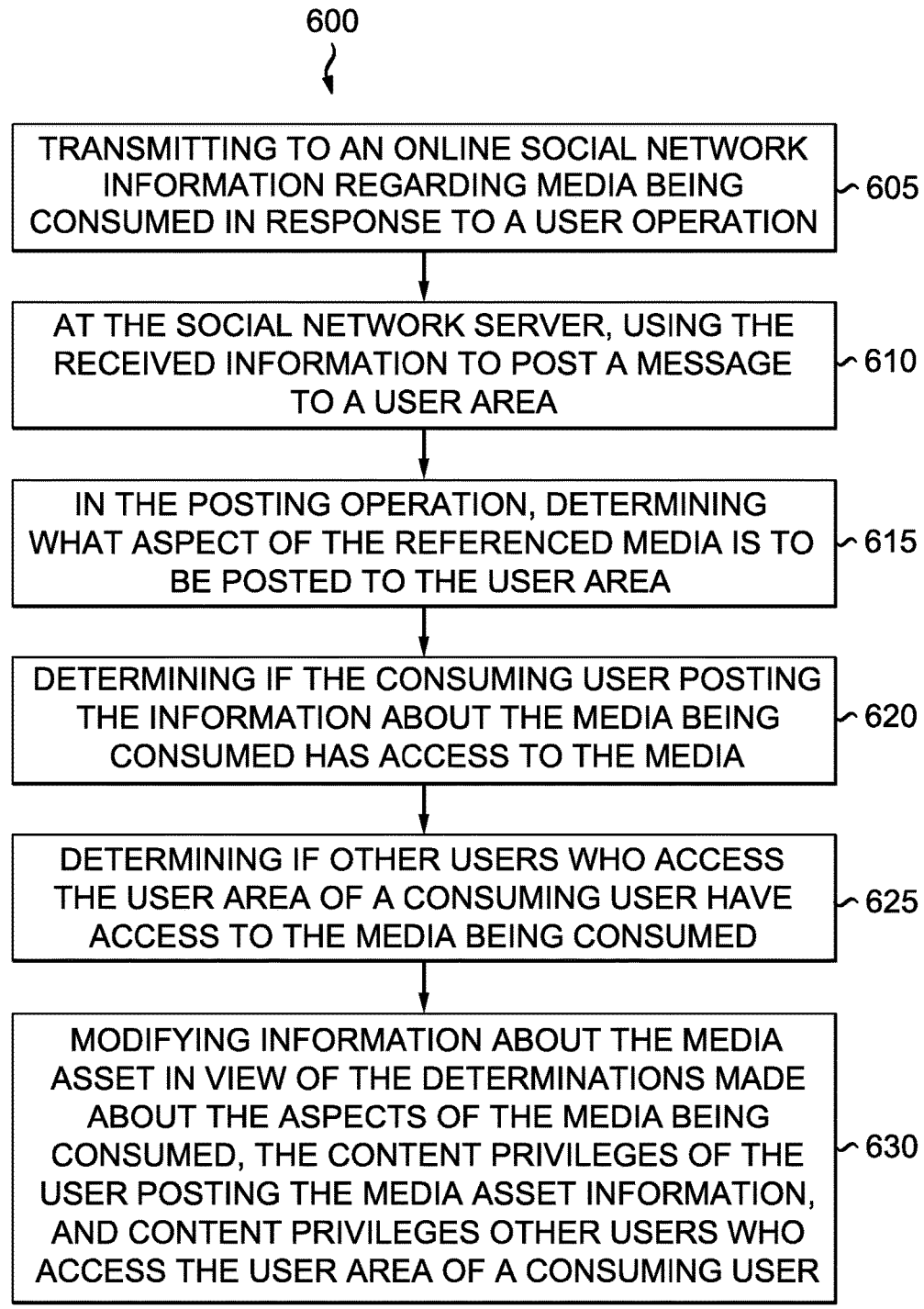
FIG. 6 details a block diagram for a method that considers whether a particular media asset being consumed by a user can be accessed by a second non-consuming user.

FIG. 6 details a block diagram for a method 600 that considers whether a particular media asset being accessed by a user can be accessed by a second non-consuming user, when the user posts information about the media asset to an online social networking server. Specifically, this example introduces that consuming user (the user who is consuming a media asset) attempts to inform other users about the media asset through the use of a social network. These other "linked" users are also referred to as being non-consuming users.

In step 605, a user consuming a media asset at a device such as STB 108, personal computer 260, tablet 270, phone 280, and the like transmits information to a social network server 240 that indicates information about a media asset that is currently being consumed. For purposes of this example, such information can be <<SERVICE ID>>&USERNAME, <<ASSETID>>&NAME&TIME, <<ASSETTYPE>> &VIDEO, <<LOCATION>>. This step also supports the concept where multiple <<SERVICE ID>> can be notified about a specific media asset where, for example, a first online social server 240 comporting to a first <<SERVICE ID>> is notified and a second online social server 245 comporting to a second <<SERVICE ID>>, which is different from the first, is also notified. This feature provides a consuming user the ability to notify multiple online social servers at the same time, instead of having to notify each one individually.

In step 610, a social network server 240 receives the information from a consuming user and will process such information into a form which is capable of being displayed in the user status area 510 of a user's page 500. Step 615 considers in the posting operation and what aspect of the information that is received from a user's consuming device is to be posted to a user's page 500. The post can use the various information that is part of the message, such as <<ASSETID>>&NAME&TIME,<<ASSETTYPE>>, and the like. Additionally, information such as <<PARENTAL-RATING>>, <<CONTENTRATING>>, and other types of descriptive information can be posted to the user status area 510, as well. For example, if a consuming user decides to post information about a movie currently being watched at the point of a consuming device, the posted status information can be a movie name (JAWS) and the type of asset (MOVIE) which is being watched at a certain time (10:30 PM on Jul. 14, 2010). Other types of information can be posted to a user's page 500 in accordance with the principles of the present invention.

The information posted to a user's page 500 can also be various representations of a media asset. Such representations can be a screen shot, a video sequence, the complete media asset itself, or an excerpt of the media asset itself. One way of achieving such a result considers that a media asset that a consuming user refers to is within a content server 450 that is part of a social media server 240. A single screen shot from the media asset can be made and present to a user's status area 510. Likewise, the content server can generate a sequence of a number of seconds to be played back. Also, the content server 450 can also show the complete media asset in the user status area 510. Application window 530 can also be used for displaying the complete media asset or part of such an asset.

A second approach can be used for indicating what part of a media asset is to be displayed in user status area 510, where the <<LOCATION>> and the <<PERMISSIONS>> fields are used for a media asset. In one scenario, a user's consuming device uses these fields in the posting request. When such information is received by the online social server 240, the web server 410 uses the location information to request the media asset from a server at that particular location (such as media server 210). In addition, the permissions information is used to specify what part of the media asset is to be made available. This type of request can be fulfilled from a media server 210 itself or from a content manager 205.

A third approach can be implemented where the location specified in the <<LOCATION>> decides what part of a media asset is to be provided. For example, a content manager 205 or media server 210 determines that the media asset requested from a particular online social server 240 should only be the first five seconds of the media asset. This portion is provided to the social server 240 where this part of the media asset is to be rendered in user status area 510 and/or application window 530. Other variations of what parts of a media asset can be used, as well.

In step 620, a determination is made whether a consuming user posting information about a media asset has access to the consumed media. This step considers information that is related to the <<PERMISSIONS>> field and/or information about the subscriptions that a consuming user maintains. For purposes of the subscriptions, such information is handled via a system such as content manager 205, 235. As explained previously, a consuming user can have a subscription to access media assets that are stored on a media server 210, 215, 225, 230. The access to such content is negotiated through the use of a content manager 205,235.

If user attempts to post information about a media asset that is subscribed to or can be accessed without restriction, a media server or content manager will provide some form of the media asset to a social networking server 240, if prompted. If the consuming user does not have the permissions to access a media asset without restriction or through a subscription, a media server and/or content manager can make available an alternative media asset.

In step 625, as in step 620, a determination is made whether a non-consuming user who will receive the post via a user page 500 can access reference media asset. Within this determination, such a determination can be made by a social networking server, a content manager, and/or a media server. Specifically, an online server 240 can inquire with a content manager 205 if a non-consuming user has access to a referenced media asset. If so, the content manager 205 can make the asset available to online server 240, as to display information about the asset in a page 500 that corresponds to the non-consuming user. Information about the media asset can be listed in other user status 520 area (as corresponding to an update for a consuming user). The referenced media asset, itself, can also be displayed in an application window 530 for a page 500 that corresponds to the non-consuming user.

Alternative content can also be made available to non-consuming user. Such an approach can be performed in accordance with the ideas provided previously and will be further explained in FIG. 7 for method 700.

Step 630 performs the accumulation of the determinations made in steps 615, 620, and 625. The aspects of how a media asset is to be posted are completed in this step. That is, depending on the content privileges of a consuming user and a non-consuming user, it is possible that the representation of the asset can differ between users. For example, if a consuming user has full access to a media asset, the post of information about the media asset to the consuming user's page 500 will allow the media asset to be fully accessed by the user in the future. Likewise, if a non-consuming user has limited permissions to access a cited media asset, an alternative version of a media asset, such as a trailer or a screenshot of the media asset, is provided to the page 500 of the non-consuming user.

Figure 7:
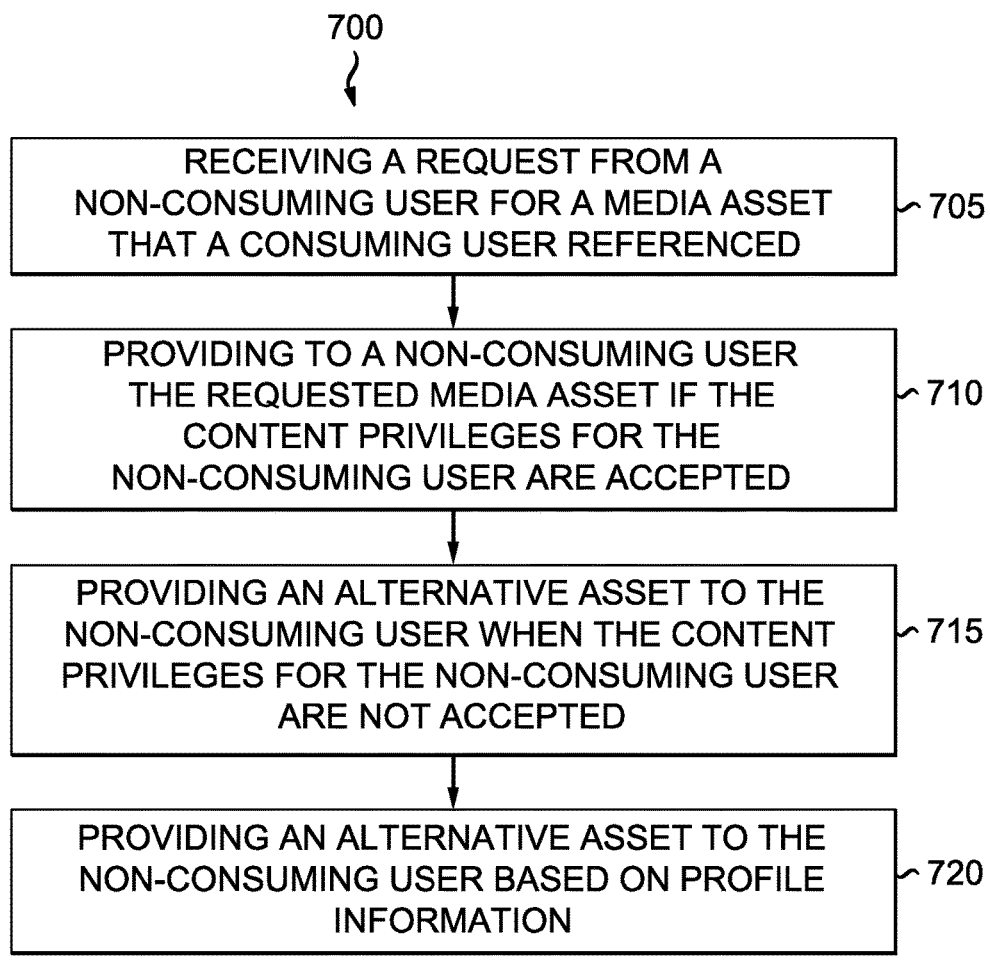
FIG. 7 is a block diagram for a method for determining what media asset a non-consuming user is to receive in response to information about an asset that a consuming user is consuming.

FIG. 7 is a block diagram for a method 700 that details what media asset a non-consuming user is to receive in response to information about an asset that a consuming user is consuming. Step 705 beings with an apparatus such as a content manager (205, 235), media server (210, 215, 225, 230), and/or an online social server (240,245) receives information about the content a user is consuming. Typically, the consuming information instructs the receiving apparatus with information that is listed in TABLES 1 to 6, although other information can be transmitted used. This received information should indicate that a specific non-consuming user wants to receive the media asset of interest <<SERVICE ID>>&USERNAME at a particular location of the user <<LOCATION>>. There are other ways that a user can be identified (IP address, e-mail address, user ID, login ID, and the like), as well.

The information that is received in step 705 can be generated in response to an action from a consuming user, a non-consuming user, automatically from an online social server, a content manager, media server, or from another source. For example, one of reasons why such information is generated is that a non-consuming user will select the consumed media asset in response to a message posted to the non-consuming user's page 500. The posted message being a "status update" from the consuming user which is about what media asset the user is consuming.

In step 710, the receiving apparatus provides to a non-consuming user a requested media asset if the content privileges for the non-consuming user are accepted. Some types of media assets are available in the clear and are not restricted in use. Other media assets must be paid for and are only available if a non-consuming user has paid money for such media assets and/or has a subscription to receive such media assets. If a non-consuming user has access to a media asset; the media asset can be delivered to the location of a non-consuming user, a device of the non-consuming user, the location of an online social network server, and the like. The form of the media asset can also vary depending on the subscription/content privileges, where the media asset could be delivered in a form that can be played back but not stored, can be stored completely, can be only stored on a device of a non-consuming device, and the like. Encryption and other security features can be employed between a content manager, content server, and a device of a non-consuming user to ensure that a media asset cannot be copied to non-authenticated users.

In step 715, a determination is made as to provide a non-consuming user alternative content from the content requested in steps 705 and 710. This alternative content can be predetermined content that represents a shortened form of a requested media asset such as a selected time interval in the media asset. The alternative content can also be another media asset. Some examples are as follows where such examples are not exhaustive:

TABLE 7

| Request Media Asset | Alternative Media Asset |
| --- | --- |
| Movie | Movie Trailer, Movie Commercial, Website for the Movie, Screenshot of a Movie, Movie Poster, Link to IMDB, A Video of a Critic Discussing the Movie |
| Television Show | Advertisement for the Television Show, Screenshot of the Television Show, Link to IMDB, |
| Music | 30 Second Clip of the Music, Generating a webpage listing the artist responsible for writing/playing music. |

For example, if a high definition (HD) version of a video asset is being accessed by a consuming user using a subscription service such as HBO, a screen shot or a short video segment in SD video can be sent to the non-consuming user through the social network. In contrast, a consuming user could receive an HD version of the show if the user pays for HBO (as explained previously for step 710). It is contemplated that other factors such as resolution, bit rate, codec can be adjusted as well, depending on the permissions of a user.

In step 720, an alternative asset is made available to a non-consuming user in response to profile information a non-consuming user. This option provides several different scenarios where there is information that is not related to the content privileges that impacts what alternative content is to be provided to a non-consuming user. Sometimes, a non-consuming user can select in advance that in response to information about movies, the user receive alternative content (a movie trailer). Other conditions for receiving alternative content can also used; the non-consuming user sets up a minimum content rating for received assets (do not send content below 3 stars), parental ratings (do not deliver any content that is for an adult, instead deliver content rated at G), and other criteria can be used as well.

FIG. 8 provides a view of an electronic program guide grid 800 that details the media that different consuming users have accessed. Instead of using a page 500 as shown in FIG. 5, a program guide view is utilized instead. Typically, an electronic program guide uses a grid where the left/vertical side of the grid uses identification information (in the case different users that a user has "linked to") and time information on the horizontal/top side of the grid. In the present example, time information is broken down into hour increments. The presented grid provides information from users associated with different online social networks (240, 245)

The metadata used for filling out the grid can come from the various postings that consuming users generate, which are meant for a social networking service. For example, in most posting requests fields such as <<SERVICE ID>>&USERNAME identify a user and the social networking service the user is associated with. Fields as <<ASSETID>>&NAME&TIME, <<ASSETTYPE>> identify the media asset being accessed and the time of the media asset. This information can be correlated by a device such as STB 108, personal computer 260, tablet 270, phone 280, online social server 240, 250, content manager 205, and the like to generate an EPG grid. The grid introduces that information about an application being used &APPLICATION can be listed as well (information about using YOU-TUBE, or a social network being accessed, and the like).

FIG. 9 provides a view of an electronic program guide grid 900 that details the media that different consuming users have accessed with regular channel listings. Grid 900 is developed using information about consuming users and from regular electronic program guide sources such as ROVI, TRIBUNE MEDIA SERVICES, and the like. That is, this view provides both channel listing information and information about non-consuming users.

Within the context of FIGS. 8 and 9, a user can add consuming users to an electronic program guide listing as a "favorite channel". For example, a user can indicate that they want to replace a user Jerry and channel 7 from an EPG listing, as shown in FIG. 9, as to add a new user Carmen and a broadcast channel 9, as shown in FIG. 10. That is, users themselves can be considered to be just like broadcast channels whereby a user can treat to Carmen's or Lisa's consumption choices as a channel, just like a broadcast channel such as channel 9 for WGN or channel 2 for CBS.

FIG. 10 also demonstrates some additional information where information developed from the <<LOCATION>> field can denote for a media asset with the same name, that such a media asset is being consumed from different sources. For example, the movie Barton Fink is being consumed by Carmen from a source affiliated with HBO, and Simon is having the movie streamed from a source such as Netflix. The source designation can include web sites, a content manager, a content server, a broadcaster, and a media asset provider such as NETFLIX, HULU, and other source. Attributes described in TABLE 5 can assist in this description of the source for the electronic program guide.

In addition, FIG. 10 shows an additional feature that is developed for the field <<ASSETID>> &ASSETCOMPLETE that indicates how much of a particular asset a user has completed. For example, FIG. 10 shows that Bob has watched 42% of the Transformers Movie while Simon has consumed 53% of Barton Fink. Such completion values can be updated in real time as a user is consuming the asset or after a time period has elapsed such as an hour or other predetermined time period. Other electronic program guide views can be developed as well, in accordance with the principles of the present invention.

FIG. 10 presents an additional channel that is called FACEBOOK friends. This channel is an aggregation of the most consumed media of a plurality of users that a user is linked to for a particular time. This is a determination that can be made at the point of a social networking server or at the point of a user who is viewing an EPG. For example, for all the FACEBOOK friends a user is linked to, the most consumed asset at 7 is David Letterman and is 9 it is South Park on Comedy Central. Note, the plurality can be all of users a user is linked to, can be a preselected amount of linked users determined by a user, and the like.

The invention claimed is:

1. A method, comprising:
    receiving, via a device associated with a first user and from a first social network server, first information indicating a first plurality of media assets being consumed by a first plurality of second users linked to the first user via a first social network website;
    receiving, via the device, second information from a second social network server different from the first social network server and indicating a second plurality of media assets being consumed by a second plurality of second users linked to the first user via a second social network website different from the first social network website;
    generating, via the device, screen data to display a grid having a first axis and a second axis in dependence upon the received first and second information, wherein the first axis identifies the first and second pluralities of second users respectively linked to the first user via the first and second different social network websites, and the second axis identifies respective times the media assets are being consumed by the second users;
    receiving, via the device, an input from the first user requesting access to one of the media assets displayed in the grid;
    processing, via the device, the input to determine a content category associated with the media asset requested for access; and
    providing, via the device and to the first user, an alternative media asset instead of the media asset requested for access, wherein the alternative media asset is selected by the device in dependence upon the determined content category associated with the media asset requested for access.

2. The method of claim 1, wherein the determined content category is selected from among a movie category, a television show category and a music category.

3. The method of claim 2, wherein the alternative media asset is a lower definition version of the media asset requested for access.

4. The method of claim 1, further comprising:
    generating screen data to display along the first axis, information indicating a most consumed asset by a plurality of the second users linked together in one of the first and second social network websites.

5. The method of claim 1, wherein the media assets being consumed by the second users are represented in the grid by metadata from postings that the second users generate when using the first and second social network websites.

6. The method of claim 1, further comprising:
enabling, in response to a first command from the first user, removal of one of the second users and the media assets being consumed by that second user from the grid; and
enabling, in response to a second command from the first user, addition of a new user and the media assets being consumed by the new user to the grid.

7. The method of claim 1, further comprising:
removing a channel from the grid, in response to said channel being removed from a favorite channel function; and
adding a new channel to the grid, in response to said new channel being added to the favorite channel function.

8. The method of claim 1, further comprising:
generating screen data to display location information in the grid of at least one of the media assets being consumed.

9. The method of claim 1, further comprising:
generating screen data to display information in the grid about a percentage of completion of at least one of the media assets being consumed.

10. A computer program product, comprising a computer usable non-transitory storage medium having a computer readable program code embodied therein, the computer readable program code adapted to be executed to implement a method for generating a program grid, the method comprising:
receiving, via a device associated with a first user and from a first social network server, first information indicating a first plurality of media assets being consumed by a first plurality of second users linked to the first user via a first social network website;
receiving, via the device, second information from a second social network server different from the first social network server and indicating a second plurality of media assets being consumed by a second plurality of second users linked to the first user via a second social network website different from the first social network website;
generating, via the device, screen data to display the program grid having a first axis and a second axis in dependence upon the received first and second information, wherein the first axis identifies the first and second pluralities of second users respectively linked to the first user via the first and second different social network websites, and the second axis identifies respective times the media assets are being consumed by the second users;
receiving, via the device, an input from the first user requesting access to one of the media assets displayed in the program grid;
processing, via the device, the input to determine a content category associated with the media asset requested for access; and
providing, via the device and to the first user, an alternative media asset instead of the media asset requested for access, wherein the alternative media asset is selected by the device in dependence upon the determined content category associated with the media asset requested for access.

11. The computer program product of claim 10, wherein the determined content category is selected from among a movie category, a television show category and a music category.

12. The computer program product of claim 10, further comprising: generating screen data to display along the first axis, information indicating a most consumed asset by a plurality of the second users linked together in one of the first and second social network websites.

13. The computer program product of claim 10, wherein the media assets being consumed by the second users are represented in the program grid by metadata from postings that the second users generate when using the first and second social network websites.

14. The computer program product of claim 10, further comprising:
enabling the first user to remove, one of the second users and the media assets being consumed by that second user from the program grid; and
enabling the first user to add a new user and the media assets being consumed by the new user to the program grid.

15. The computer program product of claim 10, further comprising:
removing a channel from the grid, in response to said channel being removed from a favorite channel function; and
adding a new channel to the grid, in response to said new channel being added to the favorite channel function.

16. The computer program product of claim 10, further comprising:
generating screen data to display location information in the program grid of at least one of the media assets being consumed.

17. The computer program product of claim 10, further comprising:
generating screen data to display information in the program grid about a percentage of completion of at least one of the media assets being consumed.

18. The computer program product of claim 11, wherein the alternative media asset is a lower definition version of the media asset requested for access.

19. A device, comprising:
an input configured to receive, for a first user: (i) first information from a first social network server indicating a first plurality of media assets being consumed by a first plurality of second users linked to the first user via a first social network website, and (ii) second information from a second social network server different from the first social network server and indicating a second plurality of media assets being consumed by a second plurality of second users linked to the first user via a second social network website different from the first social network website; and
a processor configured to generate screen data to display an electronic program guide comprising a grid having a first axis and a second axis in dependence upon the received first and second information, wherein the first axis identifies the first and second pluralities of second users respectively linked to the first user via the first and second different social network websites, and the second axis identifies respective times the media assets are being consumed by the second users, wherein the processor is further configured to:
process an input from the first user requesting access to one of the media assets displayed in the grid to determine a content category associated with the media asset requested for access;
select an alternative media asset in dependence upon the determined content category associated with the media asset requested for access; and
provide to the first user, the alternative media asset instead of the media asset requested for access.

20. The device of claim 19, wherein the determined content category is selected from among a movie category, a television show category and a music category.

21. The device of claim 20, wherein the media assets being consumed by the second users are represented in the grid by metadata from postings that the second users generate when using the first and second social network websites.

22. The device of claim 19, wherein the processor is further configured to generate screen data to display, along the first axis, information indicating a most consumed asset by a plurality of the second users linked together in one of the first and second social network websites.

23. The device of claim 19, wherein the media assets being consumed by the second users are represented in the grid by metadata from postings that the second users generate when using the first and second social network websites.

24. The device of claim 19, where the processor is further configured to:

enable, in response to a first command from the first user, removal of one of the second users and the media assets being consumed by that second user from the grid; and enable, in response to a second command from the first user, addition of a new user and the media assets being consumed by the new user to the grid.

25. The device of claim 19, where the processor is further configured to:

remove a channel from the grid, in response to said channel being removed from a favorite channel function; and add a new channel to the grid, in response to said new channel being added to the favorite channel function.

26. The device of claim 19, where the processor is further configured to generate screen data to display location information in the grid of the at least one of the media assets being consumed.

27. The device of claim 19, where the processor is further configured to generate screen data to display information in the grid about a percentage of completion of at least of one of the media assets being consumed.

* * * * *